April 9, 1929.  W. J. ANDRES  1,708,167
BRAKE MECHANISM
Filed May 25, 1925  3 Sheets-Sheet 3
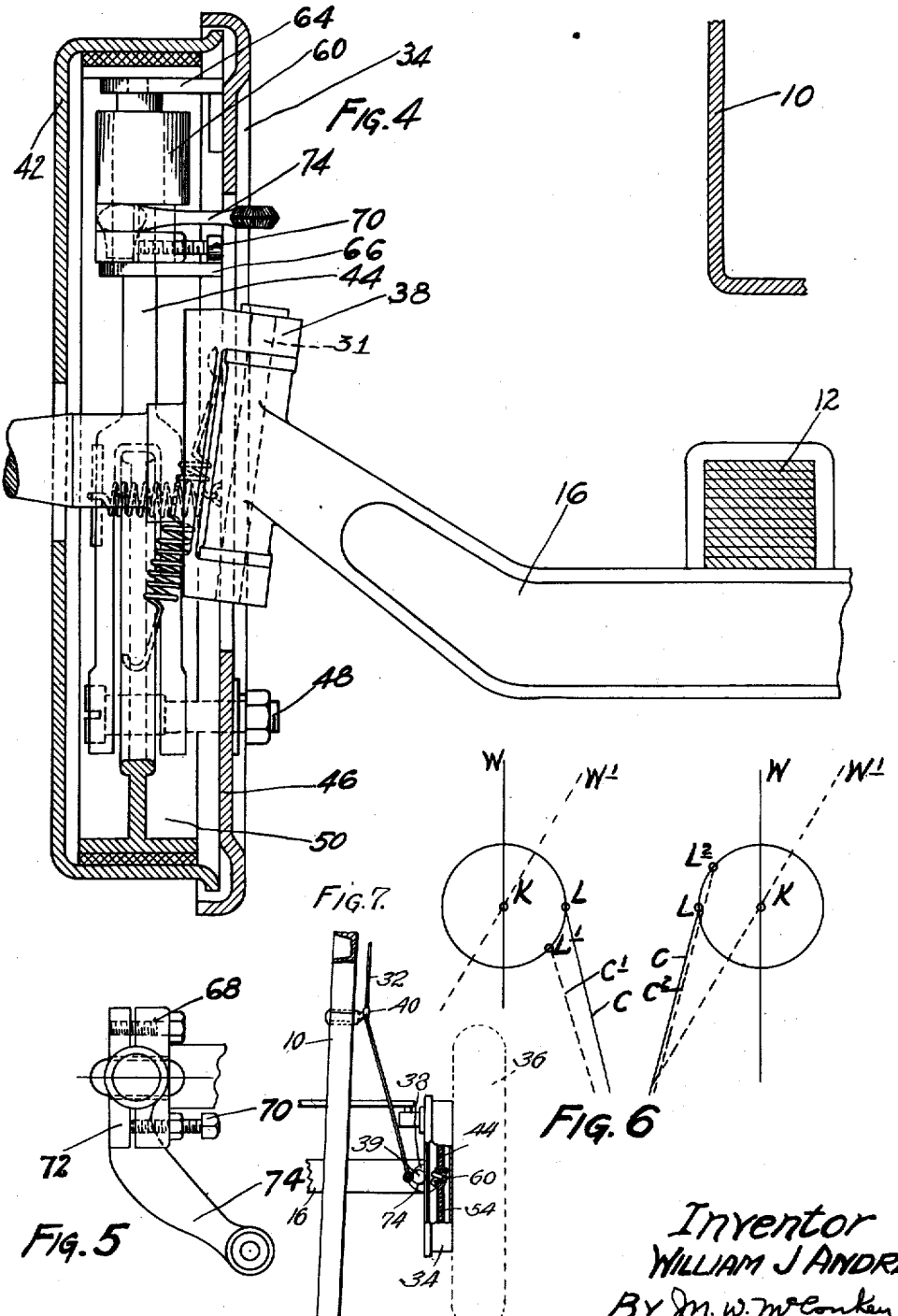

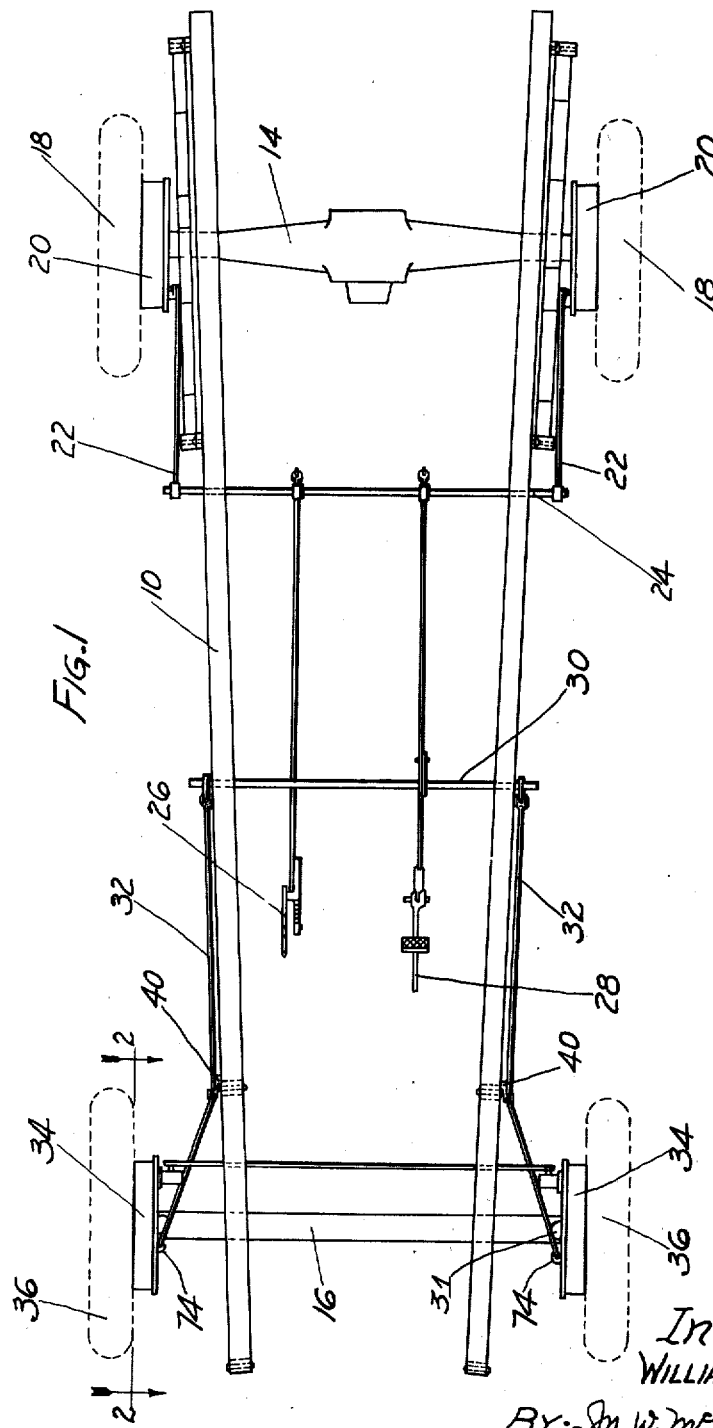

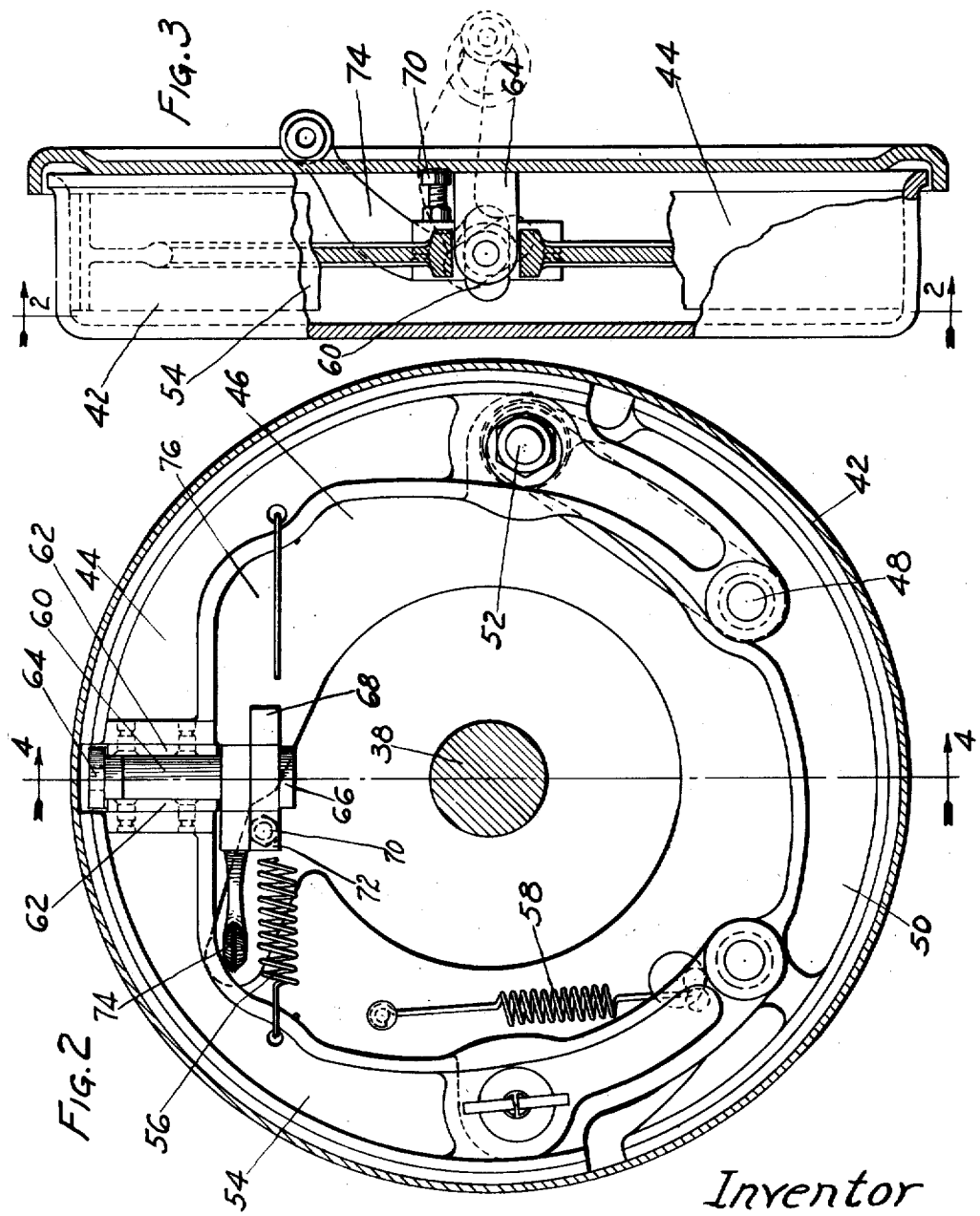

Patented Apr. 9, 1929.

1,708,167

UNITED STATES PATENT OFFICE.

WILLIAM J. ANDRES, OF SOUTH BEND, INDIANA, ASSIGNOR TO BENDIX BRAKE COMPANY, OF CHICAGO, ILLINOIS, A CORPORATION OF ILLINOIS.

BRAKE MECHANISM.

Application filed May 25, 1925. Serial No. 32,631.

This invention relates to brakes, and is illustrated as embodied in an automobile chassis having brakes on all four wheels.

An important object of the invention is to provide reliable and inexpensive operating connections for a brake on a swivelled wheel, by the use of a member, shown as a cable or equivalent tension element, rocking a brake-applying arm or other part, preferably rearwardly in a substantially horizontal plane, from an idle position spaced from the swivelling axis of the wheel to a position substantially in that axis. This permits the use of operating connections for a front brake which are just as simple and efficient as the usual connections for a rear brake.

Another very important feature of the invention relates to mounting the cam or other brake-operating device for movement about an axis extending radially of the wheel, instead of in the usual manner for movement about an axis parallel to the wheel axis. This permits a much simpler and more compact adjustment and, while not necessarily limited to such use, is especially desirable in a front wheel brake operated by a swinging arm such as described above. Preferably means is provided for adjusting the relative angular positions of the cam and its arm, the particular adjusting means shown embodying in itself substantial novelty.

Regarding the novel brake from the point of view of use for a wheel swivelling for steering movement, I consider it highly desirable that the connections be arranged to vary the operation of the brake when the wheel is swivelled, as, for example, by releasing the brake when the wheel is on the outside of a turn. Accordingly, various features of the invention relate to arranging the parts of a brake of the type described above in such a manner with respect to the swivelling axis as to secure the desired variation in the braking. In arranging the particular brake shown on the drawings to release when on the outside of a turn, the point of engagement between the brake-operating arm and its cable when in active position is on the opposite side of the swivelling axis from the wheel, so that the swivelling of the wheel swings the arm in a direction to slacken the cable.

Other objects and features of the invention, including various novel combinations of parts and desirable particular constructions, will be apparent from the following description of one illustrative embodiment shown in the accompanying drawings, in which:

Figure 1 is a top plan view of an automobile chassis having brakes on all four of the wheels;

Figure 2 is a vertical section on the line 2—2 of Figure 1 just inside one wheel and showing the brake shoes in side elevation;

Figure 3 is a top plan view of the brake detached from its wheel, and partly broken away to show the cam-operating means;

Figure 4 is a section on the line 4—4 of Figure 2 showing one front brake in vertical section;

Figure 5 is a detail view showing in bottom plan the brake-operating arm;

Figure 6 is a diagram corresponding to a top plan view of the two front wheels and illustrating the release of the outer brake on a turn; and Figure 7 is a view corresponding to part of Figure 1, but showing the left front brake applied, and broken away to show the brake shoes as in Figure 3.

In the particular arrangement selected for illustration, the invention is shown embodied in an automobile chassis including a chassis frame 10, supported by the usual springs 12 on a rear axle 14, and on front axle 16. The rear axle 14 is supported by the rear road wheels 18, each of which is provided with a brake 20, the two brakes being operated by links 22 extending rearwardly from a rock shaft 24, operated either by an emergency brake lever 26 or by a service brake pedal 28. The pedal 28 is also arranged to rock a shaft 30 connected by cables or the like 32 to the brakes 34 for the front wheels 36 rotatably mounted on knuckles 38, swivelled by the usual king pins 31 at the ends of the front axle 16. The cables 32 or the like may be supported by idler arms 40 or by pulleys or the like on the chassis frame 10 opposite the rear ends of the front springs so that the front portions of the cables are practically unaffected by movement of the springs.

Each of the brakes is illustrated as including a suitable drum or equivalent friction member 42 rotating with the wheel, and arranged to co-operate with retarding means supported by the swivelled knuckle 38 and illustrated as a 3-shoe brake of the "Bendix" type. This brake includes a reverse shoe 44 anchored on the backing plate 46 at 48, and a forward shoe 50 anchored at 52 and operated by circumferential movement of the unanchored or servo shoe 54. A spring 56 urges the shoes 44 and 54 away from the drum and an auxiliary spring 58 urges the shoe 50 away from the drum until overcome by circumferential movement of the shoe 54. The anchor 48 passes through a comparatively large opening in the web of shoe 50 and the anchor 52 passes through a similar comparatively large opening in forked arms constituting continuations of the web of shoe 44, which arms straddle the ends of the web of the shoe 50.

According to an important feature of the invention, the shoes 44 and 54, or their equivalents, are spread against the drum by rocking a double cam 60, or equivalent spreading device, about an axis extending radially of the drum between the ends of the shoes, the cam preferably engaging steel wear-plates 62 on the ends of the brake shoes. The cam is shown as supported by a spindle journaled in the upper and lower supports 64 and 66 secured in any desired manner to the backing plate 46.

Secured to the cam or its spindle is a member 68 in which is adjustably mounted a set screw 70 engaging a lug 72 formed on a cam-operating arm 74 loosely sleeved on the spindle of the cam and extending through an opening 76 in the backing plate 46.

The end of the horizontal arm 74 which is engaged by the end of the cable 32 is movable from an idle position shown in Figure 3, in which the end part of the lever is spaced a substantial distance from the swivelling axis of the wheel, to an active position shown in Figure 7, in which the brakes are applied and in which this part of the lever is in or immediately adjacent the swivelling axis of the wheel. This provides a very simple operating connection readily adjustable by means of the set screw 70 and which does not in any way interfere with the swivelling of the wheels.

I prefer to arrange the above described parts so that the outer brake is released in rounding a corner by providing that there shall be no equalization between the two front brakes, each of which is connected separately by its cable 32 to an operating arm on shaft 30, and by so arranging the point of engagement between the cable 32 and the end part of the arm 74 that in its active position this point of engagement is so arranged with respect to the swivelling axis as to secure the desired variation. As illustrated in Figure 6, when the brakes are applied by cables, diagrammatically indicated by the lines C, and the outer brake is to be released on a turn, the point of engagement L between each cable and lever arm 74 should be on the opposite side of the king pin K from the wheel,—that is, on the inside of the king pin. Figure 6 represents diagrammatically a top plan view of the two front brakes and their connections, with the front of the vehicle at the top of the figure.

If now the positions of the wheels when the vehicle is moving straight ahead is indicated diagrammatically by the lines W parallel to the wheels, but passing through the swivelling axes, i. e. the axes of the king pins, K, and if the wheels are swivelled to the positions W', to turn a corner to the right, obviously the left-hand point L tends to be swung by the knuckle to the position L', while the right-hand point L tends to move to the position L². Since the cables 32 are under tension when the brakes are applied, the movement of the outer lever 74 from L to L' will slacken its cable and release its brake, while the tendency of the right-hand lever to move from L to L² will increase the tension on the cable and tighten the inner brake.

While one illustrative embodiment of my invention has been described in detail, it is not my intention to limit its scope to that particular embodiment or otherwise than by the terms of the appended claims.

I claim:

1. Brake mechanism for a wheel rotatably mounted on a swivelled knuckle and comprising, in combination, retarding means swivelling with the knuckle, a member swivelling with the knuckle and movable in an approximately horizontal plane to operate the retarding means and having a part moving from a position spaced from the swivelling axis toward said axis, and operating connections engaging said part of the member to apply the retarding means.

2. Brake mechanism for a wheel rotatably mounted on a swivelled knuckle and comprising in combination, retarding means swivelling with the knuckle, an arm carried by the knuckle and swinging in an approximately horizontal plane to operate the retarding means and having a part moving from a position spaced from the swivelling axis toward said axis, and operating connections engaging said part of the arm to apply the retarding means.

3. Brake mechanism for a wheel rotatably mounted on a swivelled knuckle and comprising, in combination, retarding means swivelling with the knuckle, an arm swinging in an approximately horizontal plane to operate the retarding means and having a part moving from a position spaced from the swivelling axis toward said axis, operating connections engaging said part of the arm to apply the retarding means, and means for adjusting the angular position assumed by the arm when the retarding means is applied.

4. Brake mechanism for a wheel rotatably mounted on a swivelled knuckle and comprising, in combination, retarding means swivelling with the knuckle, a member carried by the knuckle and arranged to apply the retarding means and movable from an idle position in which a part is spaced forwardly of the swivelling axis to an active position adjacent said axis, and means engaging said part of the member to move it from idle to active position.

5. Brake mechanism for a wheel rotatably mounted on a swivelled knuckle and comprising, in combination, retarding means swivelling with the knuckle, an arm swivelling with the knuckle and arranged to apply the retarding means and movable in a generally horizontal plane from an idle position in which a part is spaced forwardly of the swivelling axis to an active position adjacent said axis, and means engaging said part of the arm to move it from idle to active position.

6. Brake mechanism for a wheel rotatably mounted on a swivelled knuckle and comprising, in combination, retarding means swivelling with the knuckle, a member arranged to apply the retarding means and movable from an idle position in which a part is spaced forwardly of the swivelling axis to an active position adjacent said axis, means engaging said part of the member to move it from idle to active position, and means for adjusting the angular position of the arm when in active position.

7. Brake mechanism for a wheel rotatably mounted on a swivelled knuckle and comprising, in combination, retarding means swivelling with the knuckle, a part swivelling with the knuckle and arranged to apply the retarding means and movable from the idle position spaced from the swivelling axis toward said axis, and a tension element connected to said part to operate it to apply the retarding means.

8. Brake mechanism for a wheel rotatably mounted on a swivelled knuckle and comprising, in combination, retarding means swivelling with the knuckle, a part swivelling with the knuckle and arranged to apply the retarding means and movable from an idle position spaced from the swivelling axis toward said axis, and a flexible cable connected to said part to operate it to apply the retarding means.

9. Brake mechanism for a wheel rotatably mounted on a swivelled knuckle and comprising, in combination, retarding means swivelling with the knuckle, a part swivelling with the knuckle and arranged to apply the retarding means and movable from an idle position spaced forwardly from the swivelling axis rearwardly toward said axis, and a rearwardly-extending tension element connected to said part and operative to apply the retarding means.

10. Brake mechanism for a wheel rotatably mounted on a swivelled knuckle and comprising, in combination, retarding means swivelling with the knuckle, an arm swivelling with the knuckle and arranged to apply the retarding means and having a part movable from an idle position spaced forwardly of the steering axis toward said axis, and a rearwardly-extending tension element connected to said part of the arm.

11. Brake mechanism for a wheel rotatably mounted on a swivelled knuckle and comprising, in combination, retarding means swivelling with the knuckle, an arm swinging in a generally horizontal plane to apply the retarding means and having a part movable from an idle position spaced forwardly of the steering axis toward said axis, a rearwardly-extending tension element connected to said part of the arm, and means for adjusting the angular position of the arm in active position.

12. Brake mechanism for a wheel rotatably mounted on a swivelled knuckle and comprising, in combination, retarding means swivelling with the knuckle, a device for operating the retarding means which is movable about an axis generally radial with respect to the wheel, a member for rocking said device about its radial axis and having a part movable from an idle position spaced from the swivelling axis toward said axis, and means engaging said part of the member to move it from idle to active position.

13. Brake mechanism for a wheel rotatably mounted on a swivelled knuckle and comprising, in combination, brake shoes swivelling with the knuckle, a device for spreading the brake shoes apart to brake the wheel and which is movable about an axis generally radial with respect to the wheel, a member for rocking said device about its radial axis and having a part movable from an idle position spaced from the swivelling axis toward said axis, and means engaging said part of the member to move it from idle to active position.

14. Brake mechanism for a wheel rotatably mounted on a swivelled knuckle and comprising, in combination, brake shoes swivelling with the knuckle, a cam between the ends of the shoes movable about an axis extending radially of the wheel, an arm for rocking the cam having a part movable from an idle position spaced from the swivelling axis toward said axis, means engaging said part of the arm for moving it from idle to active position, and means for adjusting the relative angular positions of the cam and arm.

15. Brake mechanism for a wheel rotatably mounted on a swivelled knuckle and comprising, in combination, brake shoes swivelling with the knuckle, a cam between the ends of the shoes movable about an axis extending radially of the wheel, an arm for rocking the cam having a part movable from an idle position spaced from the swivelling axis toward said axis, means engaging said part of the arm for moving it from idle to active position, and means for adjusting the relative angular positions of the cam and arm.

16. Brake mechanism for a wheel rotatably mounted on a swivelled knuckle and comprising, in combination, brake shoes swivelling with the knuckle, a cam between the ends of the shoes movable about an axis extending radially of the wheel, and means for rocking the cam about said radial axis to apply the shoes without interfering with swivelling of the knuckle.

17. Brake mechanism comprising, in combination, a drum, shoes anchored within the drum, a double cam between the free ends of the shoes, a laterally-extending arm for rocking the cam about an axis radially of the drum, and means for adjusting the relative angular positions of the cam and arm.

18. Brake mechanism for a wheel rotatably mounted on a swivelled knuckle and comprising, in combination, retarding means swivelling with the knuckle, an arm arranged in a generally horizontal plane to apply the retarding means and having a part movable towards the swivelling axis from an idle position spaced from said axis, and means engaging said part to move it to active position, the point of engagement between said means and said part in active position being so arranged with respect to the swivelling axis as to vary the action of the retarding means when the wheel is swivelled.

19. Brake mechanism for a wheel rotatably mounted on a swivelled knuckle and comprising, in combination, retarding means swivelling with the knuckle, an arm arranged in a generally horizontal plane to apply the retarding means and having a part movable toward the swivelling axis from an idle position spaced from said axis, and means engaging said part to move it to active position, the point of engagement between said means and said part in active position being so arranged with respect to the swivelling axis as to release the retarding means when the wheel is on the outside of a turn.

20. Brake mechanism for a wheel rotatably mounted on a swivelled knuckle and comprising, in combination, retarding means swivelling with the knuckle, a member arranged to operate the retarding means and having a part movable rearwardly toward the swivelling axis from an idle position forwardly of the axis, and means engaging said part to move the member to active position, the point of engagement of said means and said part in active position being so arranged with respect to the swivelling axis as to vary the action of the retarding means when the wheel is swivelled.

21. Brake mechanism for a wheel rotatably mounted on a swivelled knuckle and comprising, in combination, retarding means swivelling with the knuckle, a member arranged to operate the retarding means and having a part movable rearwardly towards the swivelling axis from an idle position forwardly of the axis, and a tension element engaging said part to pull the member rearwardly to active position, the point of engagement of said element and said part in active position being arranged at one side of the swivelling axis so as to vary the action of the retarding means when the wheel is swivelled.

22. Brake mechanism for a wheel rotatably mounted on a swivelled knuckle and comprising, in combination, retarding means swivelling with the knuckle, a member arranged to operate the retarding means and having a part movable rearwardly towards the swivelling axis from an idle position forwardly of the axis, and a tension element engaging said part to pull the member rearwardly to active position, the point of engagement of said element and said part in active position being arranged on the opposite side of the swivelling axis from the wheel.

23. Operating means for a brake on a swiveled wheel comprising a generally horizontal lever swiveling with the wheel and having its end swinging toward the swiveling axis of the wheel, in applying the brake, on a generally horizontal arc, in combination with a tension operating element connected to said end of the lever.

24. Brake mechanism for a swiveled wheel comprising, in combination, a drum rotating with the wheel, a backing plate at the open side of the drum, friction means within the drum, and a generally-horizontal lever arranged to apply the friction means and which is pivotally supported by the backing plate and which extends across the plane of the backing plate so that one end is between the drum and backing plate and the other end is outside the backing plate and swings in a horizontal arc toward the swiveling axis of the wheel in applying the brake, together with operating means acting on said other end of the lever.

25. Brake mechanism for a wheel comprising, in combination, a drum rotating with the wheel, a backing plate at the open side of the drum, friction means within the drum, and a generally-horizontal lever arranged to apply the friction means and which is pivotally supported by the backing plate and which extends across the plane of the backing plate so that one end is between the drum and backing plate and the other end is outside the backing plate and swings in a horizontal arc in applying the brake, together with operating means acting on said other end of the lever.

26. Brake mechanism for a swiveled wheel comprising, in combination with the wheel pivot defining the swiveling axis, a drum rotating with the wheel, a backing plate at the open side of the drum, friction means within the drum, and a generally-horizontal lever arranged to apply the friction means and which extends across the plane of the backing plate so that one end is between the drum and backing plate and the other end is outside the backing plate and swings in a horizontal arc toward said swiveling axis of the wheel in applying the brake, together with operating means acting on said other end of the lever.

27. Brake mechanism for a wheel comprising, in combination, a drum rotating with the wheel, a backing plate at the open side of the drum, friction means within the drum, and a generally-horizontal lever arranged to apply the friction means and which extends across the plane of the backing plate so that one end is between the drum and backing plate and the other end is outside the backing plate and swings in a horizontal arc in applying the brake, together with operating means acting on said other end of the lever.

28. Brake mechanism for a swiveled wheel comprising, in combination, a drum rotating with the wheel, a backing plate at the open side of the drum, friction means within the drum, and a lever arranged to apply the drum and which swivels with the wheel and which extends across the plane of the backing plate so that one end is between the drum and backing plate and the other end is outside the backing plate and swings in an arc toward the swiveling axis of the wheel in applying the brake, together with operating means acting on said other end of the lever.

29. Brake mechanism comprising, in combination, a rotatable drum, a backing plate at the open side of the drum, friction means within the drum, and a lever arranged to apply the drum and which is supported by the backing plate and which extends across the plane of the backing plate so that one end is between the drum and backing plate and the other end is outside the backing plate and swings in an arc in applying the brake, together with operating means acting on said other end of the lever.

In testimony whereof I have hereunto signed my name.

WILLIAM J. ANDRES.

DISCLAIMER 1,708,167.—*William J. Andres*, South Bend, Ind. BRAKE MECHANISM. Patent dated April 9, 1929. Disclaimer filed September 24, 1938, by the assignee, *Bendix Brake Company*.

Hereby enters this disclaimer of claim 1 of said patent.

[*Official Gazette October 18, 1938.*]

the drum, and a generally-horizontal lever arranged to apply the friction means and which extends across the plane of the backing plate so that one end is between the drum and backing plate and the other end is outside the backing plate and swings in a horizontal arc toward said swiveling axis of the wheel in applying the brake, together with operating means acting on said other end of the lever.

27. Brake mechanism for a wheel comprising, in combination, a drum rotating with the wheel, a backing plate at the open side of the drum, friction means within the drum, and a generally-horizontal lever arranged to apply the friction means and which extends across the plane of the backing plate so that one end is between the drum and backing plate and the other end is outside the backing plate and swings in a horizontal arc in applying the brake, together with operating means acting on said other end of the lever.

28. Brake mechanism for a swiveled wheel comprising, in combination, a drum rotating with the wheel, a backing plate at the open side of the drum, friction means within the drum, and a lever arranged to apply the drum and which swivels with the wheel and which extends across the plane of the backing plate so that one end is between the drum and backing plate and the other end is outside the backing plate and swings in an arc toward the swiveling axis of the wheel in applying the brake, together with operating means acting on said other end of the lever.

29. Brake mechanism comprising, in combination, a rotatable drum, a backing plate at the open side of the drum, friction means within the drum, and a lever arranged to apply the drum and which is supported by the backing plate and which extends across the plane of the backing plate so that one end is between the drum and backing plate and the other end is outside the backing plate and swings in an arc in applying the brake, together with operating means acting on said other end of the lever.

In testimony whereof I have hereunto signed my name.

WILLIAM J. ANDRES.

DISCLAIMER 1,708,167.—*William J. Andres*, South Bend, Ind. BRAKE MECHANISM. Patent dated April 9, 1929. Disclaimer filed September 24, 1938, by the assignee, *Bendix Brake Company*.

Hereby enters this disclaimer of claim 1 of said patent.

[*Official Gazette October 18, 1938.*]